(12) United States Patent
Oku et al.

(10) Patent No.: US 11,706,290 B2
(45) Date of Patent: Jul. 18, 2023

(54) DIRECT SERVER REPLY FOR INFRASTRUCTURE SERVICES

(71) Applicant: Fastly, Inc., San Francisco, CA (US)

(72) Inventors: Kazuho Oku, Tokyo (JP); Janardhan Iyengar, San Francisco, CA (US); Artur Bergman, Denver, CO (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 17/502,610

(22) Filed: Oct. 15, 2021

(65) Prior Publication Data

US 2022/0131934 A1 Apr. 28, 2022

Related U.S. Application Data

(60) Provisional application No. 63/104,430, filed on Oct. 22, 2020.

(51) Int. Cl.
  *G06F 15/16* (2006.01)
  *H04L 67/1014* (2022.01)
(52) U.S. Cl.
  CPC .............................. *H04L 67/1014* (2013.01)
(58) Field of Classification Search
  CPC .................................................. H04L 67/1014
  USPC ....................................................... 709/217
  See application file for complete search history.

(56) References Cited

U.S. PATENT DOCUMENTS

| | | | | |
|---|---|---|---|---|
| 6,728,748 | B1* | 4/2004 | Mangipudi | H04L 67/1002 718/105 |
| 7,139,939 | B2* | 11/2006 | Greenlee | G06F 11/3495 714/4.2 |
| 9,613,048 | B2* | 4/2017 | Lin | H04L 67/568 |
| 9,838,353 | B2* | 12/2017 | Roskind | H04L 61/2553 |
| 9,990,372 | B2* | 6/2018 | Lin | G06F 16/1774 |
| 10,291,705 | B2* | 5/2019 | Jung | H04L 61/457 |
| 10,298,713 | B2* | 5/2019 | Li | H04L 67/34 |
| 10,484,266 | B2* | 11/2019 | Shelar | H04L 45/22 |
| 10,630,772 | B2* | 4/2020 | Jung | H04L 67/1097 |
| 10,911,063 | B2* | 2/2021 | Suresh | H03M 7/425 |
| 10,944,660 | B2* | 3/2021 | Hurson | H04L 47/193 |
| 10,951,515 | B2* | 3/2021 | Shelar | H04L 45/22 |
| 11,025,513 | B2* | 6/2021 | Guan | G06F 21/604 |
| 11,159,408 | B2* | 10/2021 | Svennebring | H04W 24/08 |
| 11,245,729 | B2* | 2/2022 | Monni | H04L 41/0893 |
| 11,262,954 | B2* | 3/2022 | Shah | G06F 13/1605 |

* cited by examiner

*Primary Examiner* — Alicia Baturay

(57) ABSTRACT

An edge server of an infrastructure service establishes a transport connection in user space with a client and in accordance with a transport layer network protocol. The edge server receives a packet over the transport connection with the client that comprises a request for an object. If the edge server cannot serve the object, it forwards the request to a cluster server with an intent indicated for the cluster server to reply directly to the client. The cluster server receives the forwarded request and determines whether to accept the intent indicated by the edge server. If so, the edge server conveys instructions to the cluster server for sending at least a portion of the object directly to the client. The cluster server then sends at least the portion of the object to the client in accordance with the instructions.

18 Claims, 8 Drawing Sheets

DIRECT SERVER REPLY FOR INFRASTRUCTURE SERVICES

CROSS REFERENCE TO RELATED APPLICATIONS

This application claims the benefit of U.S. Provisional Application No. 63/104,430, filed Oct. 22, 2020, the entire contents of which is hereby incorporated by reference.

TECHNICAL FIELD

Aspects of the disclosure are related to the field of computing and communications and, more particularly, to the operations of infrastructure services.

BACKGROUND

Content delivery networks, edge cloud platforms, and other types of infrastructure services send and receive huge volumes of data. The data is typically sent and received between servers and end points over logical connections that are created and torn down dynamically as needed to handle packet flows over the connections. The servers and end points establish the connections with each other, typically in accordance with one or more of a variety of transport protocols such as the Transport Control Protocol (TCP) and—more recently—QUIC.

The servers and end points also establish application layer connections with each other to facilitate their data exchange, examples of which include the Hypertext Transfer Protocol (HTTP) and its extensions. A given server in a datacenter may receive an HTTP request from an end user for an object that the server can either provide from its own cache or obtain from another server in the datacenter before sending it to the end user. Example objects include images, videos, web pages (or components thereof), or any other type of content that can be cached. The server delivers the requested object over the transport layer connection established between it and the end user, regardless of whether the server had the object in its possession or had to obtain it from a different server.

Various drawbacks to this arrangement result when the terminating server has to obtain the content from the other server. First, the object has to transit the datacenter twice: once from the source server to the terminating server, and a second time from the terminating server out to the end user. The terminating server also expends valuable processing resources simply relaying the packets for the object from the source server to the end user. Finally, if the object is not commonly requested, it will occupy valuable cache memory in both servers simultaneously, potentially reducing the overall performance of the datacenter.

OVERVIEW

Technology is disclosed herein for operating an infrastructure service more efficiently when serving objects to end users. In an implementation, an edge server of the infrastructure service establishes a transport connection in user space with a client and in accordance with a transport layer network protocol. The edge server receives a packet over the transport connection with the client that comprises a request for an object. If the edge server cannot serve the object, it forwards the request to a cluster server with an intent indicated for the cluster server to reply directly to the client.

The cluster server receives the forwarded request and determines whether to accept the intent indicated by the edge server. Assuming that the cluster server accepts the intent, the edge server conveys instructions to the cluster server for sending at least a portion of the object directly to the client. The cluster server then sends at least the portion of the object to the client in accordance with the instructions. In this manner, the resources of the datacenter and the edge server are conserved by virtue of the cluster server sending the object directly to the client, without having to be relayed through the edge server.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1A:
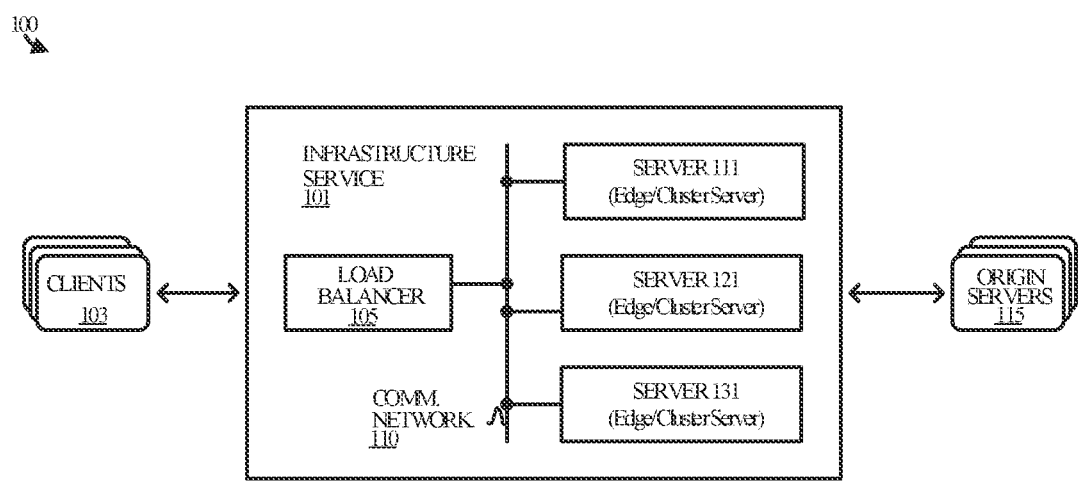
FIG. 1A illustrates an operational environment in an implementation and FIG. 1B illustrates an overview of its operations.

Technology disclosed herein relates to the enhanced operation of infrastructure services. In various implementations, a server in an infrastructure service connects with client devices in the context of serving content to the clients. Situations routinely arise where the server does not possess the content requested by a client and therefore retrieves the content from an origin server or forwards the request from to another server.

The second server provides the object(s) to the terminating server so that it can send the requested content to the client. However, the proposed implementations disclosed herein call for the second server to reply directly to the client with the content, rather than relaying the content through the terminating server. Such an arrangement has the technical effect of reducing the overall traffic between the two servers and potentially accelerating the delivery of the object since it need not traverse two servers.

In a brief example, an edge server of the infrastructure service establishes a transport connection in user space with a client and in accordance with a transport layer network protocol. The server receives a packet over the transport connection with the client that includes a request for an object cached by one or more other servers in its environment. The server forwards the request to at least one of the cluster servers in the infrastructure service with an intent indicated for the cluster server to reply directly to the client.

The cluster server receives the forwarded request and determines whether to accept the intent proffered in the message or to decline the intent. In the negative case, the cluster server merely replies with the request object so that the edge server can relay it to the client.

In the affirmative case, the cluster server replies to the edge server with a request of its own to upgrade the communication connection between it and the edge server. The edge server then conveys instructions over the upgraded connection to the cluster server for replying directly to the client. The cluster server retrieves the object from persistent storage or memory and sends it to the client on the same connection used by the edge server to communicate with the client. In this manner, the client can reply to the packets sent by the cluster server as-if they were sent by the edge server, thereby keeping the session anchored with the edge server.

In some implementations, the transport layer network protocol used to connect the client and the edge server is QUIC (Quick UDP [User Datagram Protocol] Internet Connections), QUIC (as defined in IETF RFC 9000), or any variation thereof. As such, the transport connection is a QUIC connection or an extension thereof. Examples of the communication connection between the edge server and cluster server include Hypertext Transfer Protocol (HTTP) connections or extensions thereof. In some cases, the cluster server and edge server upgrade the communication connection to a stream through which to convey the instructions to the cluster server.

Alternatively, the cluster server may create a detached QUIC connection over which to receive the instructions from the edge server, instead of over the communication connection. The cluster server accepts the intent indicated by the edge server by replying to the forwarded request with an initial packet in a header of the response for establishing the detached QUIC connection between the edge server and the cluster server.

Regardless of the technique used for conveying the instructions, an example of the instructions for sending at least the portion of the object directly to the end point includes a destination of a packet to be sent to the client (e.g. an address and port for the client). The instructions may also include a packet image for building the packet (up to a stream frame header), a specified byte-range of the object to be appended to the packet image, and cypher context for encrypting the packet.

In some implementations, the cluster server generates the packet concatenating the packet image with the specified byte-range of the object. The server then encrypts the packet based on the cypher context and sends the packet to the address and port for the client, and from an address specified for the edge server. It may be appreciated that more than one cluster server may be used to serve the object directly to the client. This may be especially useful for transmitting very large objects such as video or large-scale datasets.

Referring now to the drawings, FIG. 1A illustrates operational environment 100 in an implementation. Operational environment 100 includes infrastructure service 101, clients 103, and origin servers 115. Infrastructure service 101 is representative of a content delivery network, an edge cloud platform, or the like, and is comprised of various physical and/or virtual computing and communication elements suitable for implementing a variety of associated services. In particular, load balancer 105, server 111, server 121, and server 131 reside in infrastructure service 101 and exchange packets over communication network 110. Other equipment may be included in infrastructure service 101 but are omitted for the sake of clarity. The elements of infrastructure service 101 may be co-located in a single Point-of-Presence (e.g. datacenter) or distributed over multiple PoPs.

Figure 7:
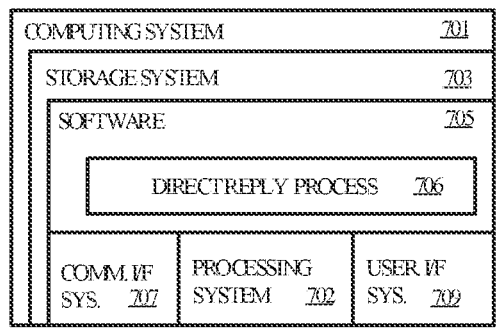
FIG. 7 illustrates a computing system suitable for implementing the various operational environments, architectures, processes, scenarios, and sequences discussed below with respect to the Figures.

Load balancer 105 is representative of any physical or virtual computing equipment capable of distributing incoming packet traffic across various servers. Load balancer 105 may be implemented on one or more computing systems, of which computing system 701 in FIG. 7 is representative. Load balancer 105 may employ, for example, a hash algorithm, a round-robin algorithm, a random (or pseudo random) algorithm, or any other type of algorithm, combination, or variation thereof, to distribute traffic to server 111, server 121, and server 131. Load balancer 105 is stateless in that it does not track connections between end users and servers.

Communication network 110 is representative of any network or collection of networks (physical or virtual) over which load balancer 105 may communicate with servers 111, 121, and 131. Communication network 110 may include various elements, such as switches, routers, and cabling to connect the various elements of infrastructure service 101. The elements may communicate with each other in accordance with any suitable protocol such as Ethernet.

Server 111, server 121, and server 131 are each representative of any physical or virtual server computer suitable for processing incoming requests for content from clients 103 and serving content to clients 103, of which computing system 701 is also broadly representative. Clients 103 are representative of the various computing devices from which requests may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end user computing device. Clients 103 communicate with infrastructure service 101 over one or more public or private networks (e.g. the Internet), combination of networks, or variations thereof.

Origin servers 115, which are optional, represent the source of content that may be cached by infrastructure service 101 in specific implementations. Origin servers 115 may be implemented on any physical or virtual computing system, of which computing system 701 in FIG. 7 is broadly representative. Examples of content that may be cached include text, images, video, web sites, objects, applications, or any other type of data, variation, or combination thereof. Origin servers 115 also communicate with infrastructure service 101 via one or more public or private networks, combination of networks, or variations thereof.

Figure 1B:
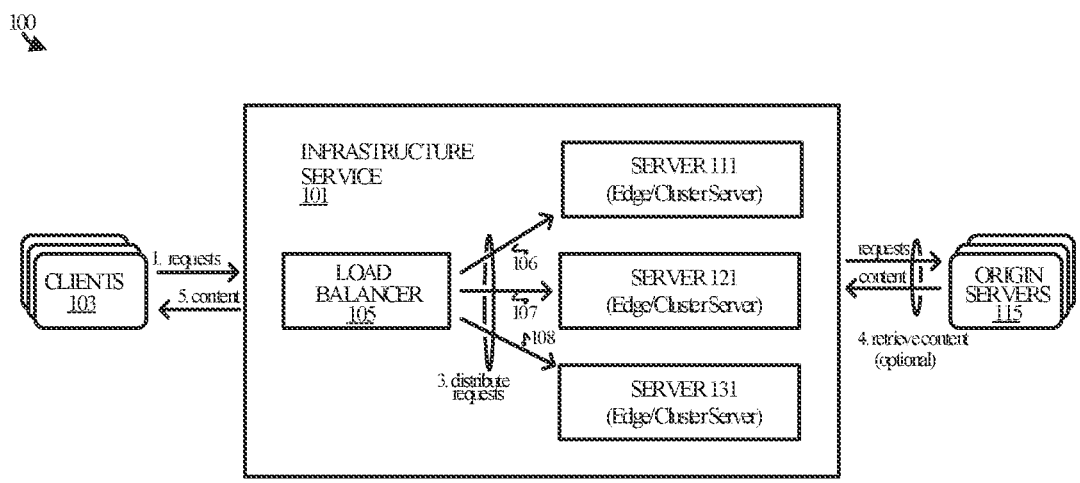

FIG. 1B illustrates a brief operational example with respect to infrastructure service 101. In operation, clients 103 send requests for content to infrastructure service 101. The requests reach load balancer 105 which, in turn, distributes them to servers 111, 121, and 131. For example:

request 106 is sent to server 111; request 107 is sent to server 121; and request 108 is sent to server 131.

The servers 111, 121, and 131 are part of a group of servers that cache content sourced from origin servers 115. Responsibility for a given object may reside with any one or more of the servers in a PoP. When a given server receives a request for an object, that server is considered the "edge" server. The edge server first determines whether it has the object in its memory and—if so—serves the object to the client. However, if the server does not have the object in its memory, it determines which "cluster" server in the datacenter is responsible for the object and forwards the request to that cluster server. If a responsible server does not have the object in its memory, then the server retrieves the content from an origin server. The object is ultimately sent to the client either by the edge server if it had the object in memory, or if it did not, then by the cluster server directly.

Figure 2:
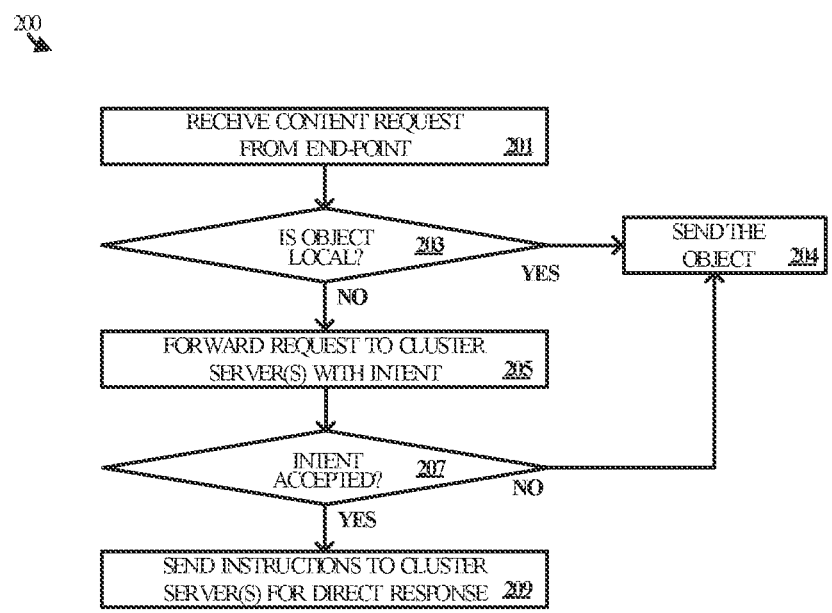
FIG. 2 illustrates a direct reply process in an implementation.
Figure 3:
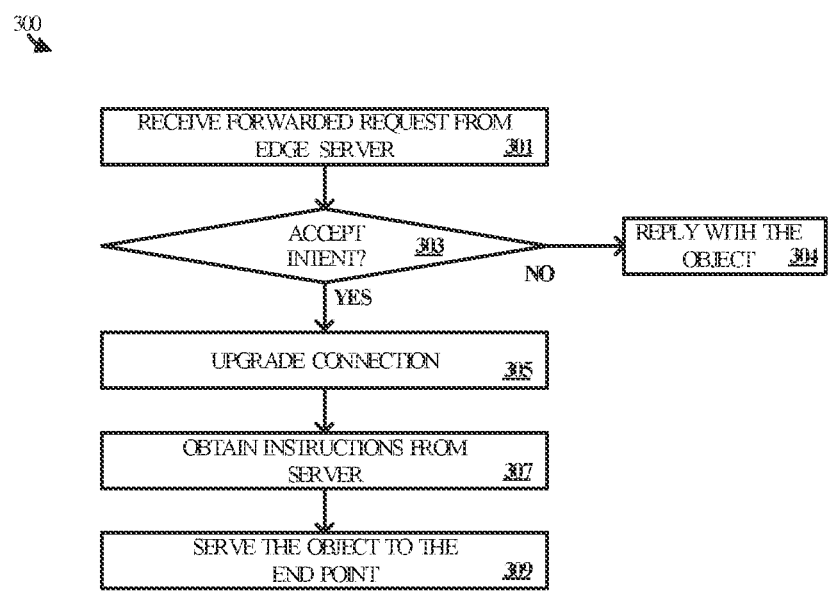
FIG. 3 illustrates another direct reply process in an implementation.

The direct server reply (DSR) noted above is achieved by employing direct reply process 200 (illustrated in FIG. 2) and direct reply process 300 (illustrated in FIG. 3). Any one or more of servers 111, 121, and 131 employs direct reply process 200 when serving as the terminating end of a transport layer connection with a client. Likewise, any one or more of servers 111, 121, and 131 employs direct reply process 300 when sending content to a client directly on behalf of a terminating server—and using the transport layer connection setup between the edge server and the client.

Direct reply process 200, which is illustrated in more detail in FIG. 2, may be implemented in program instructions in the context of any of the software applications, modules, components, or other such programming elements deployed in each server. The program instructions direct the underlying physical or virtual computing system or systems to operate as follows, referring parenthetically to the steps in FIG. 2.

To begin, an edge server receives a packet from a client (step 201). The packet may comprise a request from an end user for content of various types, such as a web site, image, video, script, application, or other such objects. The packet is received on a connection established between the edge server and the client in accordance with a transport layer protocol such as QUIC. The edge server and client may also utilize a communication protocol at a layer above the transport layer protocol or integrated with the transport layer protocol, examples of which include HTTP and its extensions (e.g. HTTP/3).

In the case where the packet comprises a request for an object, the edge server determines if the object can be served locally from its memory (step 203). If so, then the edge server sends the object immediately to the client (step 204). However, if the edge server does not have the object in its memory or local storage, then it forwards the request to another edge server in its cluster, along with an indication for the other server to serve the object to the client directly (step 205). The edge server forwards the request to the other cluster server over another transport layer connection established between the two.

Next, the edge server determines whether the intent has been accepted based on how the cluster server responds to the forwarded request (step 207). The cluster server indicates its acceptance or rejection of the intent by either: upgrading the connection between it and the edge server; or replying to the edge server with an ordinary response that does not begin the process of upgrading their connection.

In the negative case, the cluster server sends the object to the edge server which in turn relays it to the client (step 204). In the affirmative case, the edge server responds to the cluster server over an upgraded connection with instructions for sending at least a portion of the object directly to the client (step 209). For example, the instructions may specify that the entire object be sent, or they may specify only a bitrange to be sent. The edge server may also send successive instructions each specifying different subsets in a range. This may be especially true when the object is large and/or when one or more other cluster servers are involved.

Direct reply process 300 in FIG. 3 is a counterpart process to direct reply process 200. Direct reply process 300 may be implemented in program instructions in the context of any of the software applications, modules, components, or other such programming elements deployed in each server. The program instructions direct the underlying physical or virtual computing system or systems to operate as follows, referring parenthetically to the steps in FIG. 3.

To begin, a cluster server receives a forwarded request from an edge server over a transport layer connection established between the two (step 301). The forwarded request includes an indication of intent for the cluster server to reply directly to a client with an object or portion thereof. The cluster server determines whether to accept the intent at Step 303. This determination may be based on any of a variety of factors such as whether the cluster server can meet the requirements specified in the forwarded request.

If the cluster server cannot accept the intent, then it responds normally to the edge server with the content to be relayed to the client (step 304). However, if the cluster server can accept the intent, then it replies to the edge server with a request to upgrade their connection (step 305). The cluster server then obtains instructions for sending the content from the edge server over the upgraded connection (step 307) and proceeds to transmit all or a portion of the object to the client in accordance with the instructions (step 309).

Figure 4:
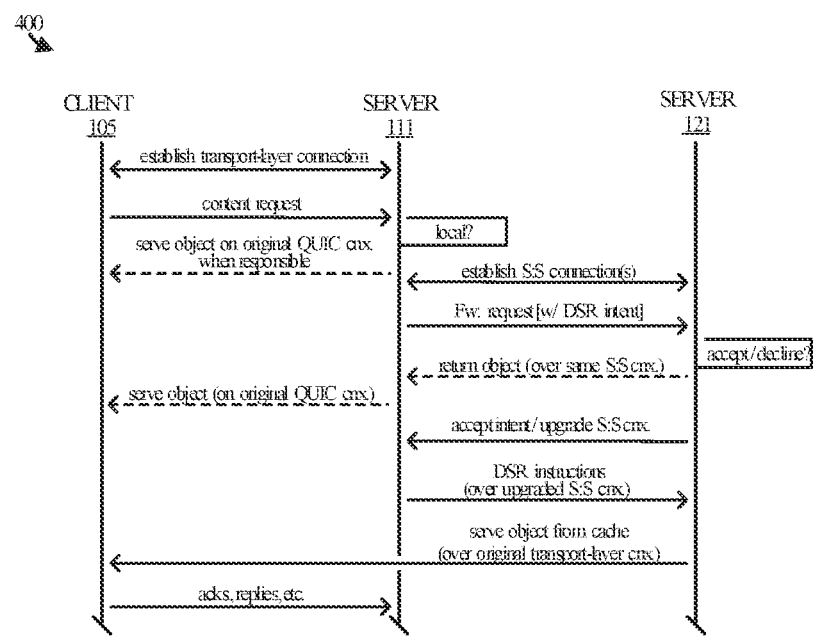
FIG. 4 illustrates an exemplary operational sequence in an implementation.

FIG. 4 illustrates an operational sequence 400 in an implementation of direct reply process 200 and direct reply process 300 with respect to the elements of FIGS. 1A-1B. In operation, server 111 and client 103 establish a transport layer connection over which to send and receive packets. Client 103 proceeds to send a packet to server 111 that comprises a request for an object. Server 111 receives the packet and determines if it has responsibility for the object. If server 111 is responsible for the object, then it can immediately serve the object to the client (or retrieve the object from the origin first). However, if server 111 does not have responsibility for the object, then it forwards the content request to server 121 with DSR intent. Server 111 forwards the request over a connection with server 121 that was established previously or that is setup for purposes of forwarding the request.

Server 121 receives the forwarded request and determines whether to accept the DSR intent. If server 121 determines to decline the intent, then it replies normally to server 111 and sends all or a portion of the object over the same connection having the same state as when the request was forwarded by server 111. Server 111 can then serve the object to the client.

However, in the affirmative case when server 121 determines to accept the DSR intent, it replies to server 111 with a message to upgrade the connection between them. For example, server 121 replies to server 111 with a message to change the connection to a stream. Alternatively, server 121 opens a detached connection with server 111 instead of changing the connection to a stream. As used herein, changing the connection to a stream and creating a detached connection are both examples of upgrading the connection.

Server 111 receives the response from server 121 and proceeds to send DSR instructions over the upgraded connection, whether it be a stream or a detached connection. The instructions include details such as: a destination of a packet to be sent to the client (e.g. an address and port for the client); a packet image for building the packet, up to a stream frame header; a specified byte-range of the object to be appended to the packet image; and cypher context for encrypting the packet.

Server 121 receives the instructions from server 111 and serves the object directly to client 103 in accordance therewith. Server 121 serves the object to client 103 over the connection established by server 111 with client 103. This is accomplished by sending the packets for the object to the address and port indicated in the instructions. To the extent client 103 sends any replies or subsequent packets, the replies are sent to server 111—not server 121—because client 103 remains connected to server 111 but not server 121. In other words, server 111 continues to anchor the session with client 103 even though server 121 and/or one or more other servers are sending the object(s).

Figure 5:
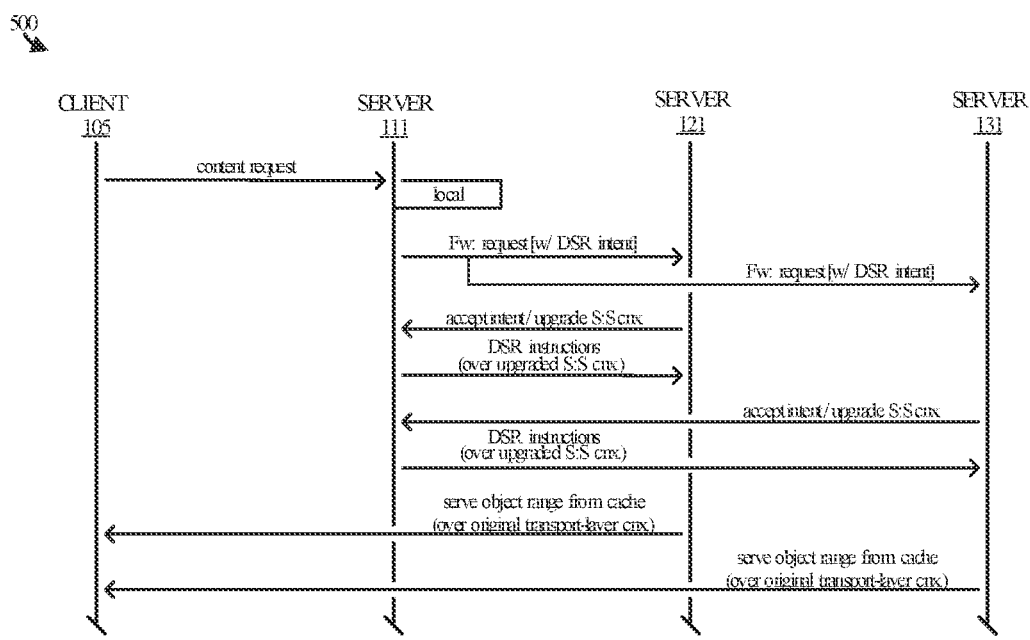
FIG. 5 illustrates also an exemplary operational sequence in an implementation.

FIG. 5 illustrates another operational scenario 500 in which server 111 utilizes two cluster servers to deliver an object to a client. In operation, server 111 and client 103 establish a transport layer connection over which to send and receive packets. Client 103 proceeds to send a packet to server 111 that comprises a request for an object. Server 111 receives the packet and determines if it has responsibility for the object. If server 111 is responsible for the object, then it can immediately serve the object to the client (or retrieve the object from the origin first). However, if server 111 does not have responsibility for the object, it forwards the content request with DSR intent to both server 121 and server 131. Server 111 forwards the request over connections with server 121 and server 131 that were established previously or that were setup for purposes of forwarding the request.

In some cases, server 111 forwards the request in parallel or at substantially the same time to both server 121 and server 131. In other cases, server 111 forwards the request in series to the servers, first to one of the servers then to another one or more of the servers. If all of the downstream servers decline the DSR intent, then server 111 obtains the object from one or more of the declining servers and serves the object to the client. If one of the servers accepts the DSR intent while the other server declines the DSR intent, server 111 cancels the request sent to the declining server so that the declining server does not send the object to server 111. However, it is assumed for exemplary purposes in FIG. 5 that both server 121 and server 131 accept the DSR intent. Both servers reply to server 121 with a message to upgrade the respective connections between them. For example, server 121 replies to server 111 with a message to change their respective connection to a stream or to open a detached connection. Likewise, server 131 replies to server 111 with a message to change their respective connection to a stream or to open a detached connection.

Server 111 receives the responses from server 121 and server 131 and proceeds to send DSR instructions over the upgraded connections, whether it be a stream or a detached connection. The instructions include details such as: a destination of a packet to be sent to the client (e.g. an address and port for the client); a packet image for building the packet, up to a stream frame header; a specified byte-range of the object to be appended to the packet image; and cypher context for encrypting the packet.

Servers 121 and 131 receive the instructions from server 111 and serve their respective portions of the object directly to client 103 in accordance therewith. For instance, server 121 serves the object to client 103 over the connection established by server 111 with client 103, as does server 131. This is accomplished by sending the packets for the object to the address and port indicated in the instructions. To the extent client 103 sends any replies or subsequent packets, the replies are sent to server 111—neither to server 121 nor server 131—because client 103 remains connected to server 111. In other words, server 111 continues to anchor the session with client 103 even though server 121 and server 131 send the object(s).

Figure 6:
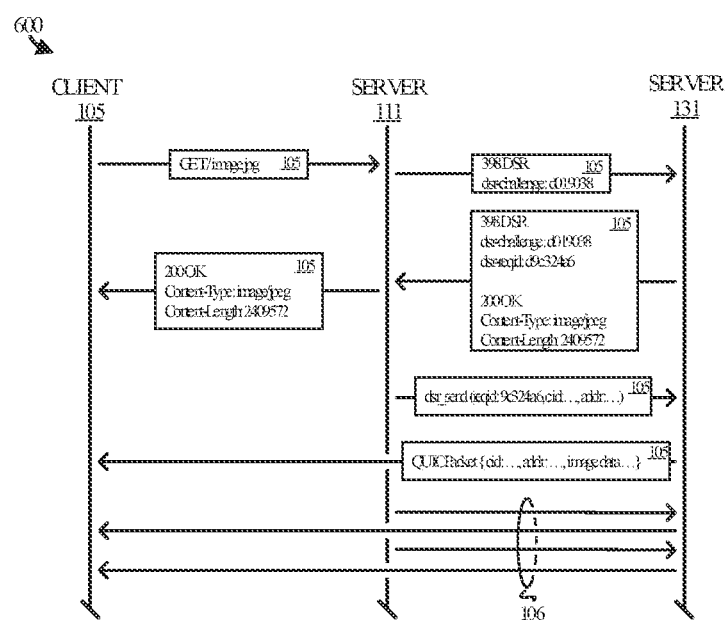
FIG. 6 illustrates an operational sequence with detailed messaging in an implementation.

FIG. 6 illustrates an operational scenario 600 specific to a QUIC implementation. Client 103 sends server 111 a request for an object that server 111 does not have in its memory. Server 111 forwards the request to a cluster node such as server 121. While doing so, server 111 includes an address for the client and indicates that server 121 could directly return the object to the user. The forward request therefore indicates DSR intent On receiving this request from server 111, server 121 node decides, based on various factors, whether to respect the DSR intent or not. If server 121 decides to decline the DSR intent, it simply falls back to responding with the object as it normally would. Server 121, on seeing a simple response from the cluster node, learns that the cluster node has declined the DSR intent, and receives and serves the object to the user as it normally would.

If server 121 decides to respect the DSR intent, it responds to server 111 with a special indication. In doing so, both the nodes also turn their communication channel (specifically, HTTP/3 stream) into a control channel over which DSR instructions can be conveyed from the edge node (server 111) to the cluster node (server 121). The cluster server now simply follows these DSR instructions for sending the object directly to the user.

All packets from the user are still being received and processed at the edge node, including acknowledgements and subsequent requests for objects. On every packet received, the edge node determines next steps and instructs the cluster node to send specific chunks of an object as necessary. The edge node effectively maintains control of the connection to the user, performing all tasks related to the connection, and the cluster node becomes a simple data store that packetizes and sends specific bytes of objects as instructed by the edge node.

More specifically, on receiving a request it cannot serve, server 111 sends an upgradable GET request to server 121 using the DSR header field to specify its intent to use DSR. The DSR header field contains key-value pairs to communicate meta information and constraints of the DSR intent. For example, the header field identifies:

1) Connection: upgrade, dsr;
2) Upgrade: dsr; and
3) DSR: quic=4278190109, cipher=4865, address="192.0.2.1:443."

In the example above, the QUIC protocol version is specified as 4278190109 (0xff00001d, draft-29), the ciphersuite is TLS_AES_128_GCM_SHA256, and the user's address is 192.0.2.1:443.

If server 121 finds itself to be capable of meeting the requirements specified in the DSR request header field, it may decide to serve the content using DSR. If it decides to, it responds with a 101 response, upgrading the HTTP connection to a stream for exchanging DSR instructions as follows:

1) HTTP/1.1 101 Upgrade;
2) Upgrade: dsr;

3) Content-type: text/html; charset=utf-8; and

4) Content-length: 12345

If server 121 decides to serve the content without using DSR, it can send an ordinary HTTP response (that does not upgrade the connection to DSR).

When the QUIC endpoint on server 111 recognizes that the response has been upgraded, it sends the HTTP response header fields downstream, with the status code rewritten to 200 and DSR header field being removed as follows:

1) HTTP/x 200 OK;

2) Content-type: text/html; charset=utf-8; and

3) Content-length: 12345.

Then, the QUIC endpoint starts sending the DSR instructions on the upgraded connection. DSR instructions contain following information:

1) destination (address:port) of the QUIC packets to be sent;

2) QUIC packet image up to the STREAM frame header;

3) offset and the length of the STREAM payload to be appended to the packet image; and 4) cipher contexts being required to encrypt the packet; i.e.: header protection secret, AEAD secret, and packet number.

When the DSR node (serer 121) receives a DSR instruction, it generates a packet by concatenating the pre-built packet image and the specified byte-range of the content, encrypts it, and sends to the specified address from the specified address.

Once all the content is served, the QUIC endpoint closes the DSR instruction connection. To server 121, the closure of this QUIC connection is the sign that it can release its reference to the object being served. However, if server 121 loses state of that connection before the QUIC node closes it, the cache node (server 121) will notice the upgraded connection being closed and sends a RESET_STREAM frame directly to the client.

In some implementations, the state associated to DSR is discarded when either side closes the upgraded connection running on top of TCP (TLS-over-TCP). However, in some implementations the lifetime of the upgraded connection may be limited to a duration much shorter than the timeout of TCP (similar to how I/O timeouts for HTTP/1 requests can be limited). To accomplish that, either side a connection can send a PING instruction. If the other side does not respond with a PONG, the connection will be closed.

As mentioned, detached QUIC connections may be used instead of using upgraded HTTP connections to avoid packet loss (or congestion control) that may cause late delivery of DSR instructions. A detached QUIC connection can be created by including an initial packet in one of the response headers alongside a 101-response sent from the cache node. Then, the QUIC endpoint can send back all the necessary handshake messages (directly to the UDP socket of the cache node) and immediately start sending DSR instructions as 0.5-RTT data. The detached QUIC connection can be established lightweight by using PSK mode of the TLS handshake, where the PSK will be supplied using a response header field in the 101 response.

In some implementations, a direct connection between the QUIC terminator and the cache node is established for exchanging the DSR instructions. This may be accomplished by using a non-cacheable response other than 101 Switch Protocols to indicate the "upgrade," where the upgrade is a switch to a detached QUIC connection (see above) directly between the QUIC terminator and a filler node.

FIG. 7 illustrates computing system 701 that is representative of any system or collection of systems in which the various processes, programs, services, and scenarios disclosed herein may be implemented. Examples of computing system 701 include, but are not limited to, server computers, web servers, cloud computing platforms, and data center equipment, as well as any other type of physical or virtual server machine, container, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements direct reply process 706, which is representative of the direct reply processes discussed with respect to the preceding Figures. When executed by processing system 702 to provide direct server reply, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including direct reply process 706) may be implemented in program instructions and among other functions may, when executed by processing system 702, direct processing system 702 to operate as described with respect to the various operational scenarios, sequences, and processes illustrated herein. For example, software 705 may include program instructions for implementing a direct reply process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide direct server reply. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating an infrastructure service comprising:
   in an edge server of the infrastructure service:
      establishing a transport connection in user space with a client and in accordance with a transport layer network protocol;
      receiving a packet over the transport connection with the client, wherein the packet comprises a request for an object;
      forwarding the request to a cluster server of the infrastructure service with an indication of intent for the cluster server to reply directly to the client;
      receiving a response from the cluster server, including an indicator that the cluster server will reply directly to the client; and
      in response to the indicator that the cluster server will reply directly to the client, conveying instructions to the cluster server for sending at least a portion of the object directly to the client.

2. The method of claim 1 wherein forwarding the request to the cluster server comprises the edge server sending the request over a communication connection between the edge server and the cluster server, along with an address for the client and an upgrade request regarding the communication connection.

3. The method of claim 2 wherein:
   the transport layer network protocol comprises QUIC (Quick UDP [User Datagram Protocol] Internet Connections) and wherein the transport connection comprises a QUIC connection or an extension thereof; and
   the communication connection comprises a Hypertext Transfer Protocol (HTTP) connection or an extension thereof.

4. The method of claim 3 further comprising, in response to the indicator that the cluster server will reply directly to the client, the edge server upgrading the communication connection to a stream through which to convey the instructions to the cluster server.

5. The method of claim 3 further comprising:
in the cluster server, creating a detached QUIC connection over which to receive the instructions from the edge server, instead of over the communication connection; and
accepting the intent indicated by the edge server by replying to the forwarding of the request with a response in accordance with a communication protocol.

6. The method of claim 5 wherein the response
includes an initial packet in a header of the response for establishing the detached QUIC connection between the edge server and the cluster server.

7. The method of claim 1 wherein the instructions for sending at least the portion of the object directly to the end point include:
a destination of a packet to be sent to the client, wherein the destination comprises an address and port for the client;
a packet image for building the packet, up to a stream frame header;
a specified byte-range of the object to be appended to the packet image; and
cypher context for encrypting the packet.

8. The method of claim 7 further comprising, generating the packet in the cluster server by: concatenating the packet image with the specified byte-range of the object, encrypting the packet based on the cypher context, and sending the packet to the address and port for the client, and from an address specified for the edge server.

9. The method of claim 1 further comprising, in the cluster server: determining to accept the intent indicated by the edge server and sending at least the portion of the object to the client based on the instructions.

10. A system for providing an infrastructure service, the system comprising:
an edge server configured to:
establish a transport connection in user space with a client and in accordance with a transport layer network protocol;
receive a packet over the transport connection with the client, wherein the packet comprises a request for an object;
forward the request to a cluster server of the infrastructure service with an indication of intent for the cluster server to reply directly to the client;
receiving a response from the cluster server, including an indicator that the cluster server will reply directly to the client; and
in response to the indicator that the cluster server will reply directly to the client, convey instructions to the cluster server for sending at least a portion of the object directly to the client; and
the cluster server configured to receive the request forwarded by the edge server and determine whether to accept the intent indicated by the edge server.

11. The system of claim 10 wherein, to forward the request to the cluster server, the edge server is configured to send the request over a communication connection between the edge server and the cluster server, along with an address for the client and an upgrade request regarding the communication connection.

12. The system of claim 11 wherein:
the transport layer network protocol comprises QUIC (Quick UDP [User Datagram Protocol] Internet Connections) and wherein the transport connection comprises a QUIC connection or an extension thereof; and
the communication connection comprises a Hypertext Transfer Protocol (HTTP) connection or an extension thereof.

13. The system of claim 12 wherein the edge server is further configured to, in response to the indicator that the cluster server will reply directly to the client, upgrade the communication connection to a stream through which to convey the instructions to the cluster server.

14. The system of claim 12 wherein the cluster server is further configured to:
create a detached QUIC connection over which to receive the instructions from the edge server, instead of over the communication connection; and
accept the intent indicated by the edge server by replying to the request with a response in accordance with a communication protocol.

15. The system of claim 14 wherein the response
includes an initial packet in a header of the response for establishing the detached QUIC connection between the edge server and the cluster server.

16. The system of claim 10 wherein the instructions for sending at least the portion of the object directly to the end point include:
a destination of a packet to be sent to the client, wherein the destination comprises an address and port for the client;
a packet image for building the packet, up to a stream frame header;
a specified byte-range of the object to be appended to the packet image; and
cypher context for encrypting the packet.

17. The system of claim 16 wherein the cluster server is further configured to:
generate the packet in the cluster server by concatenating the packet image with the specified byte-range of the object and encrypting the packet based on the cypher context; and
send the packet to the address and port for the client, and from an address specified for the edge server.

18. The system of claim 10 wherein the cluster server is further configured to accept the intent indicated by the edge server and send at least the portion of the object to the client based on the instructions.

* * * * *